United States Patent [19]

Fischer et al.

[11] Patent Number: 5,030,043

[45] Date of Patent: Jul. 9, 1991

[54] DRIVING-IN DEVICE FOR FIXING AN ANCHOR IN A HOLE

[75] Inventors: Artur Fischer, Tumlingen; Günter Seibold, Waldachtal, both of Fed. Rep. of Germany

[73] Assignee: Fischerwerke Artur Fischer GmbH & Co. KG, Waldachtal/Tumlingen, Fed. Rep. of Germany

[21] Appl. No.: 518,116

[22] Filed: May 3, 1990

[30] Foreign Application Priority Data

May 22, 1989 [DE] Fed. Rep. of Germany ....... 3916611

[51] Int. Cl.5 ........................ B23B 51/08; B23B 45/16

[52] U.S. Cl. .................................. 408/241 R; 7/158; 7/165; 81/436; 81/461; 279/1 A; 411/55

[58] Field of Search .................. 279/1 A; 408/241 R, 408/239 A; 7/158, 165; 81/176.1, 176.15, 176.2, 436, 437, 441, 460, 461; 411/43, 55, 60, 29-31

[56] References Cited

U.S. PATENT DOCUMENTS

| | | | |
|---|---|---|---|
| 1,678,124 | 7/1928 | Perreault | 81/436 X |
| 4,468,826 | 9/1984 | Moores, Jr. | 7/158 |
| 4,867,249 | 9/1989 | Watkins, Jr. et al. | 7/158 X |
| 4,904,134 | 2/1990 | Fischer | 411/55 X |

FOREIGN PATENT DOCUMENTS

| | | | |
|---|---|---|---|
| 3300193 | 7/1984 | Fed. Rep. of Germany | 408/241 R |
| 2530306 | 1/1984 | France | 408/241 R |

*Primary Examiner*—Steven C. Bishop
*Attorney, Agent, or Firm*—Michael J. Striker

[57] ABSTRACT

A driving-in device for fixing an anchor in a hole with an undercut and comprising a drill adapted to be received in a chuck of an impact drilling machine, and a drive-in sleeve-shaped member secured to the drill for joint rotation therewith. The drive-in sleeve-shaped member has at an end thereof remote from the end at which it is secured to the drill, a bolt portion that engages a threaded sleeve member of the anchor to screw it over a threaded portion of an expanding bolt to displace an expansible sleeve over an expander portion of the threaded bolt.

4 Claims, 1 Drawing Sheet

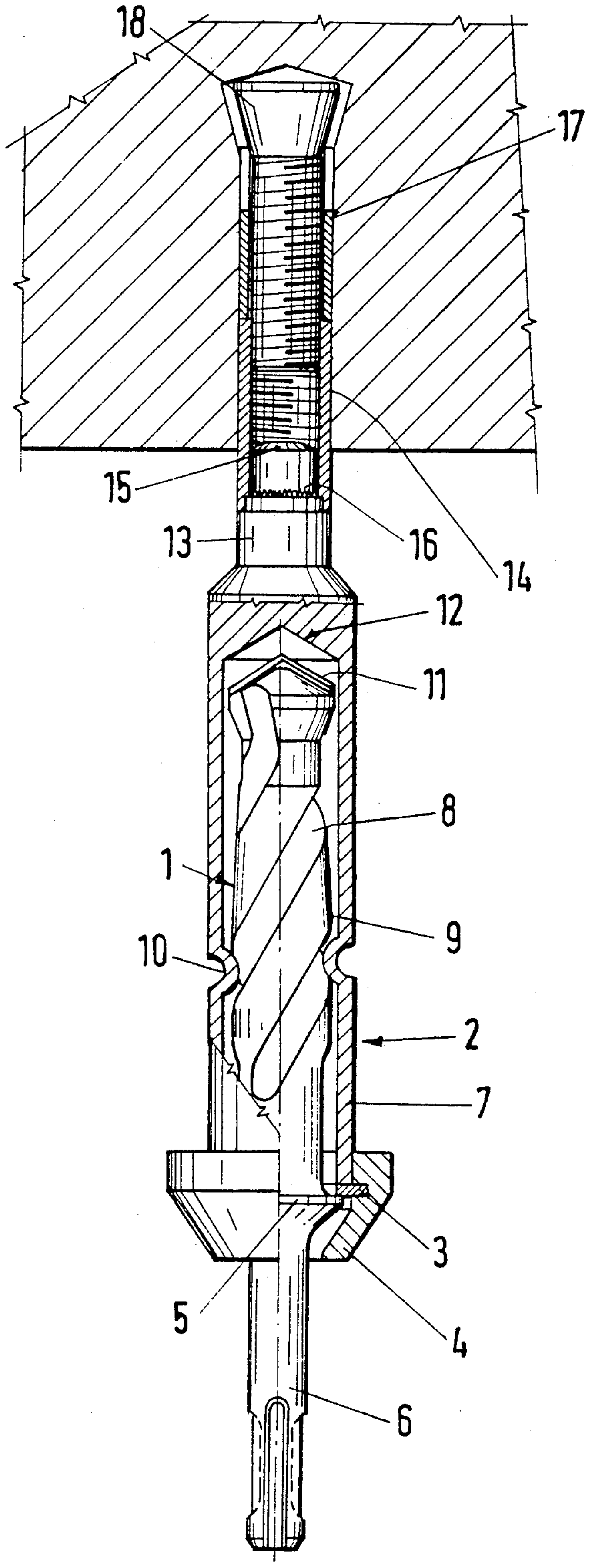
18
17
15
16
13
14
12
11
8
1
9
10
2
7
3
5
4
6

DRIVING-IN DEVICE FOR FIXING AN ANCHOR IN A HOLE

BACKGROUND OF THE INVENTION

The invention relates to a driving-in device for fixing anchors in which an expansible sleeve is displaced over an expander portion of an expanding threaded bolt placed in a hole with a free end surface of the bolt expander portion engaging the hole bottom. The expansible sleeve is displaced over the expander portion of the expanding threaded bolt by impact and, upon being expanded, engages an undercut formed at the hole bottom, with a form-locking connection. For displacing the expansible sleeve over the bolt expander portion, generally, a driving-in tool that engages a free end of the expansible sleeve is used.

SUMMARY OF THE INVENTION

The object of the present invention is a driving-in device adapted to be clamped in a chuck of an impact drilling machine or the like and which driving-in device has a simple construction and provides for optimal transmission of an impact rotary torque.

The object of the invention is achieved by providing a driving-in device comprising a drill and a drive-in sleeve-shaped member connected to the drill for joint rotation therewith for transmitting the impact rotary torque from the drill. The drive-in sleeve-shaped member is received over the drill shaft and is secured thereto with a stop washer abutting a collar formed on the drill shaft. To prevent rotation of the drill shaft relative to the drive-in sleeve-shaped member, there are provided on the drive-in sleeve-shaped member, two oppositely located and axially offset relative to each other indentations that form two bosses which engage in a drilling dust groove formed on the drill shaft. The drive-in sleeve-shaped member has, at an end thereof which is opposite to the open end thereof, a bolt-like portion for engaging a free end of a threaded sleeve member that cooperates with an expanding threaded bolt for displacing the expansible sleeve. The bolt portion of the drive-in sleeve-shaped member may be provided with a tooth ring on the circumferential shoulder of the bolt-like portion for engaging the free end of the threaded sleeve member.

The drive-in sleeve-shaped member has a bottom which is spaced from a drill bit blade when the drive-in sleeve-shaped member is mounted on the drill shaft. This spacing permits to avoid stresses on the drill bit blade and on the drive-in sleeve-shaped member during a driving-in operation, without reduction of the impact rotary torque transmitted from the impact drilling machine.

The drill used in the driving-in device according to the invention is generally used for forming drilled holes having an undercut and, to this end, the drill shaft has a bulge portion that provides for forming a bearing pivot for enabling pivotal movement of the drill. The indentations on the wall of the drive-in sleeve-shaped member are formed in a region of the wall which lies against the largest diameter of the bulge portion of the drill shaft as well as against the drilling dust groove, because it is in this region the impact rotary torque transfer is most effective. The engagement of the bosses formed as a result of indentations, with the drilling dust groove is insured by positioning of the drive-in sleeve-shaped member against the stop washer which serves as a limiting stop.

The present invention both as to its construction so to its method of operation, together with additional objects and advantages thereof, will be best understood from the following detailed description of the specific embodiment when read in connection with the accompanying drawings.

BRIEF DESCRIPTION OF THE DRAWINGS

The single FIGURE of the drawing shows a partially cross-sectional elevation view of a driving-in device according to the invention together with the anchor.

DETAILED DESCRIPTION OF THE PREFERRED EMBODIMENT

The driving-in device shown in the drawing, comprises a drill 1 and a drive-in sleeve-shaped member 2 which lies against a stop washer 3 that abuts a collar 5 formed on the drill shaft 6. A pot-shaped stop member 4 engages over the stop washer 3 and a portion of a sleeve part 7 of the drive-in sleeve-shaped member 2. When the drive-in sleeve-shaped member is mounted over the drill shaft in abutting engagement with the stop washer 3 which serves as a limiting stop. the bosses formed by indentations 10 on the sleeve part 7, engage the drilling dust groove in the region of the bulge portion of the drill shaft. The oppositely located indentations 10 are offset relative to each other along the path of the drilling dust groove 9 of the drill 1. The bosses formed by indentations 10 secure the drill against rotation relative to the drive-in sleeve-shaped member 2 and provide for transmission of the impact rotary torque to the drive-in sleeve-shaped member. The drill bit blade 11 is spaced from the bottom 12 of the sleeve part 7. However, this does not prevent the impact rotary torque from being transmitted to the drive-in sleeve-shaped member 2 from an impact drilling machine (not shown).

At the bottom 12 of the sleeve part 7, there is provided a bolt-like portion 13 that engages a threaded sleeve member 14 of the anchor and transmits the impact rotary torque to the threaded sleeve member. The threaded sleeve member 14 displaces an expansible sleeve 17 over an expander portion 18 of an expanding threaded bolt. By providing on a circumferential shoulder of a bolt projection 15 of the bolt-like portion 13, a tooth ring 16, an optimal transmission of the impact rotary torque is achieved. The teeth of the tooth ring 16 engage a corresponding inner circumferential shoulder of the threaded sleeve member 17 ensuring thereby transmission of the rotary impact torque to the threaded sleeve member.

While the invention has been illustrated and described as embodied in a driving-in device for fixing anchors in holes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A drive-in device for fixing an anchor including an expanding threaded bolt member, an expansible sleeve displaceable relative to the expanding bolt member to fix the anchor in a hole, and a threaded sleeve member cooperating with the expanding threaded bolt member to displace the expansible sleeve relative to the expanding threaded bolt member, said drive-in device comprising a drill having a drill shaft with a drilling dust groove formed thereon; a drive-in sleeve-shaped member receiving said drill shaft and having a wall, two oppositely located and offset relative to each other indentations defining two bosses engaging in said drilling dust groove to prevent rotation of said drill relative to said drive-in sleeve-shaped member, a first end at which said drive-in sleeve-shaped member is secured to said drill for joint rotation therewith, and a second end located opposite to said first end and having a bolt-like portion for engaging the threaded sleeve member to effect displacement of the threaded sleeve member relative to the expanding threaded bolt member upon rotation of said drive-in sleeve-shaped member, said bolt-like portion comprising a bolt projection of a reduced diameter and having, in a region thereof adjacent to the threaded sleeve member, a circumferential shoulder and a toothed ring formed on said circumferential shoulder.

2. A driving-in device as set forth in claim 1, wherein said drill includes a drill bit blade at a free end of said drill shaft, and said drive-in sleeve-shaped member has a bottom spaced from said drill bit blade.

3. A drive-in device for fixing an anchor including an expanding threaded bolt member, an expansible sleeve displaceable relative to the expanding bolt member to fix the anchor in a hole, and a threaded sleeve member cooperating with the expanding threaded bolt member to displace the expansible sleeve relative to the expanding threaded bolt member, said drive-in device comprising a drill having a drill shaft with a drilling dust groove formed thereon; a drive-in sleeve-shaped member receiving said drill shaft and having a wall, two oppositely located and offset relative to each other indentations defining two bosses engaging in said drilling dust groove to prevent rotation of said drill relative to said drive-in sleeve-shaped member, a first end at which said drive-in sleeve-shaped member is secured to said drill for joint rotation therewith, and a second end located opposite to said first end and having a bolt-like portion for engaging the threaded sleeve member to effect displacement of the threaded sleeve member relative to the expanding threaded bolt member upon rotation of said drive-in sleeve-shaped member; said drill having a bulge portion, said indentation being formed in a region of said wall of said drive-in sleeve-shaped member which lies against a portion of said bulge portion that has a largest diameter.

4. A drive-in device for fixing an anchor including an expanding threaded bolt member, an expansible sleeve displaceable relative to the expanding bolt member to fix the anchor in a hole, and a threaded sleeve member cooperating with the expanding threaded bolt member to displace the expansible sleeve relative to the expanding threaded bolt member, said drive-in device comprising a drill having a drill shaft with a drilling dust groove formed thereon; a drive-in sleeve-shaped member receiving said drill shaft and having a wall, two oppositely located and offset relative to each other indentations defining two bosses engaging in said drilling dust groove to prevent rotation of said drill relative to said drive-in sleeve-shaped member, a first end at which said drive-in sleeve-shaped member is secured to said drill for joint rotation therewith, and a second end located opposite to said first end and having a bolt-like portion for engaging the threaded sleeve member to effect displacement of the threaded sleeve member relative to the expanding threaded bolt member upon rotation of said drive-in sleeve-shaped member; said drill including a collar formed on said drill shaft, said driving-in device further comprising a stop washer lying against said collar, and a pot-shaped stop member engaging over said collar, said stop washer, and an end portion of said drive-in sleeve-shaped member lying adjacent to said stop washer.

* * * * *